No. 793,003. Patented June 20, 1905.

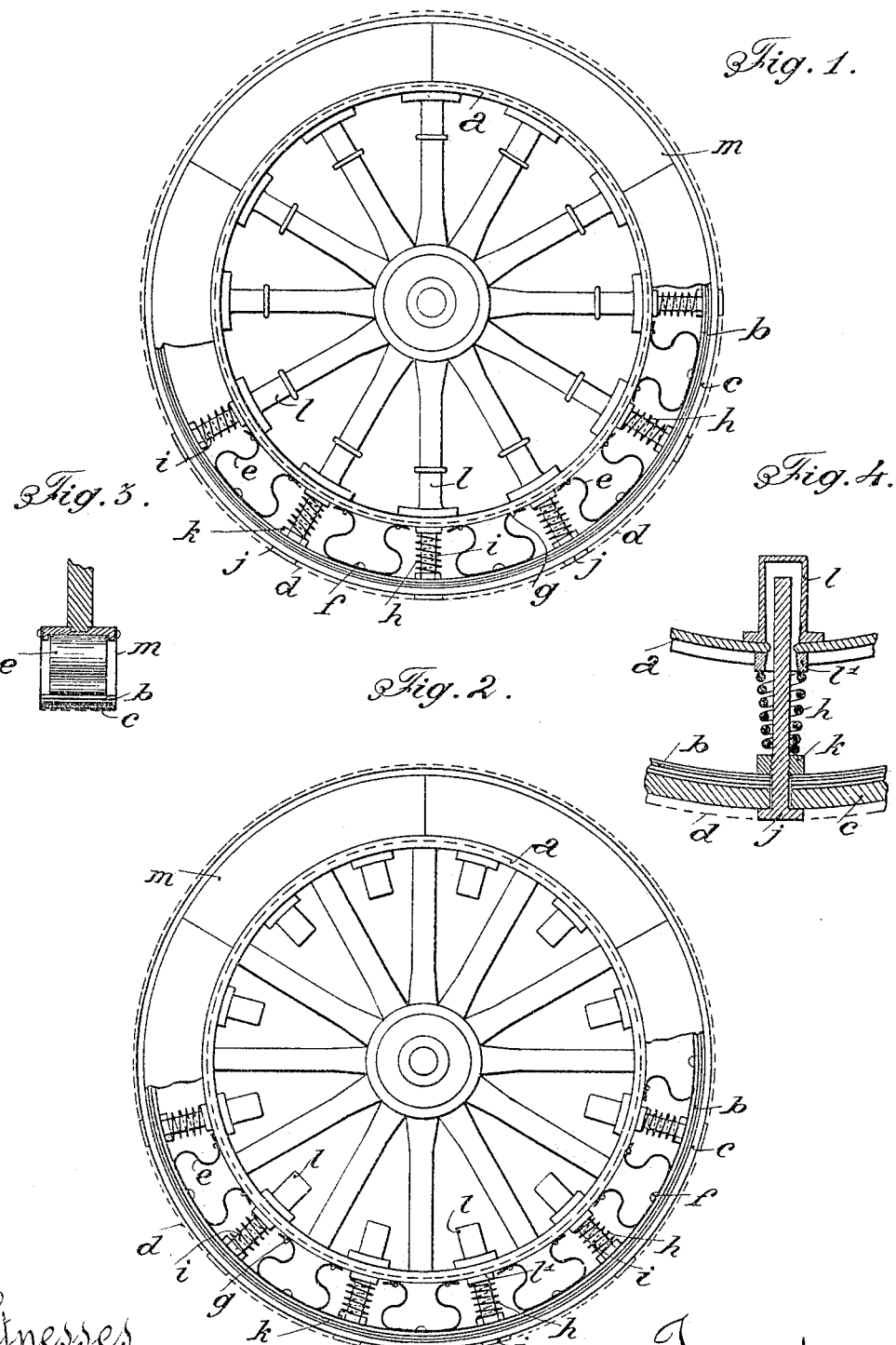

UNITED STATES PATENT OFFICE.

APOLLON MATHEY, OF LONS-LE-SAUNIER, FRANCE.

FLEXIBLE SPRING-WHEEL FOR VEHICLES.

SPECIFICATION forming part of Letters Patent No. 793,003, dated June 20, 1905.

Application filed June 7, 1904. Serial No. 211,537.

*To all whom it may concern:*

Be it known that I, APOLLON MATHEY, a citizen of the Republic of France, residing at Lons-le-Saunier, France, have invented certain new and useful Improvements in Flexible Spring-Wheels with Free Rims for Cycles, Motor-Cars, &c.; and I declare that this is a full, clear, and exact description of the same.

The present invention has reference to a flexible wheel comprising two concentrical rims, the inner one of which is stationary and rigid and wherefrom the spokes are directed to the hub, while the other outer rim is independent from the first and is flexible. Between these rims are arranged two series of springs—the first for giving the desired rigidity to the whole wheel, the second, which are spiral springs, being mounted on stems within the sockets fixed to the inner rim, which stems have been provided for preventing both rims from getting out of shape and for keeping them constantly in the same plane.

In order to protect the springs and other pieces between both rims from the dust and mud, the sides of the free space left between both rims are closed by flexible leather or cloth bands made in several pieces and fixed in any suitable manner, so as to be easily detached for controlling the parts inside.

The annexed drawings illustrate two constructions of such wheels.

Figure 1 shows in elevation the inside and outside of a wheel constructed according to the present invention, Fig. 2 showing in elevation the outer side and free space between the rims of any wheel with tire modified according to the invention. Fig. 3 is a cross-section through the felly of the wheel shown in Fig. 2. Fig. 4 is a section made on the circumference of the wheel through the rims.

Referring to Fig. 1, a wheel with spokes and hub of any known construction is provided with an inner rim $a$, made of U-shaped irons, with flanges projecting outwardly of variable strength, according to the use, and with a second outer flexible rim made of several thin and flexible steel bands $b$, applied on each other, covered with a thick leather band $c$, forming the running-surface and provided with rivets having broad and projecting heads $d$, adapted to prevent the wearing of the leather and slipping sideward. Between these two rims are arranged the two series of springs—viz., the springs $e$, held by their simple pressure, extending to the inner width of the rigid rim $a$ and provided with three holes, one of which is for a stop-pin $f$ to pass through, rigidly connected to the outer rim, and the other two of elongated shape for two pins $g$ to freely go through fixed to the inner rim. Such arrangement prevents the springs from moving laterally, but allows them to follow the various impulses to which they are submitted without exercising any action on each other. Furthermore, since these springs $e$ are not tightened by nuts, they are not liable to break at their point of attachment; second, the spiral springs $h$, guided on stems $i$, passing through the flexible rim and having outer heads $j$ pressed against the said rim by a nut $k$. Each stem has its diameter reduced in the middle to facilitate the removing of the nut and is directed radially through the inner rim within the socket $l$, in which it may freely move, thanks to the inner section of such socket and to that of the ring that forms the extension of said socket in the space between the rims. In the direction of the circumference this section is V-shaped, and in the cross direction it has the uniform width of the diameter of the stem. The hole in the inner rim is also rounded, Fig. 4. The stems $i$ may thus follow the flexions of the outer rim, with which they are integral, without interfering with the flexibility of the latter, which they prevent from getting out of shape and always keep in the same plane as the other rim.

In the arrangement shown in Fig. 1 the sockets $l$ are connected to the rim by bolts or rivets and are simultaneously used for putting the spokes together.

In the arrangement shown in Fig. 2, where a wheel previously provided with a pneumatic tire is presumed to be transformed for the present system to be adapted thereto, the joining of the spokes with the inner rim does not undergo any changes. In case of a hollow iron rim the hollow part of the latter need only to be filled with a steel band to have a flat surface, while letting the side flanges project to take the place of the flanges of the previously-mentioned U-shaped irons. In such case the springs $e$ may be mounted as in the previous case, and the sockets $l$, the rings $l'$, the stems, and springs may all be mounted on the inner and on the outer rims in the space comprised between two spokes, Fig. 2.

To protect the springs and other parts from the dust and dirt, the sides of the space left between both rims are covered by flexible leather or fabric bands $m$, Fig. 3, made of several parts fixed by hooks or in any other suitable manner, so as to allow the parts to be easily controlled and examined, thus giving to the whole a better appearance.

All the springs can be rapidly removed without any special aid. As regards the springs $e$ it is sufficient to press them with a suitable plier, so as to disengage them from their stop-pins, and as to the spiral springs they will be removed by unscrewing the nuts from the stems, so as to completely disengage the outer rim and bring the wheel to its original form—viz., with a single rigid rim.

The chief advantages of this system are as follows: The arrangement of the outer rim allows of the shortest turning to be executed in all circumstances without being exposed to slipping off. The springs being free are not liable to break at the connection-points, as already explained. The stops on road are not to be feared, since even by supposing that one or several pieces should get out of shape or broken, which very seldom occurs, the car may continue to run without much noticing the disturbance. Moreover, the parts being interchangeable the repairing will be quickly effected. The rim, being flexible enough to take up the unevenness of the road, will considerably reduce the power required for the traction and considerably deaden the shocks and shakes. The effects of the springs $e$, added to those of the flexible rims, will reduce the shocks to such an extent that the latter will be entirely absorbed, insuring a smooth easy running of the machine.

Having thus described and ascertained the nature of my present invention, what I declare new and novel is as follows:

In a flexible wheel, an inner rim rigid with the spokes and flanged, the spokes extending inward from the said rim, sockets extending inward from said rim, and receiving and forming continuations of the spokes, an outer sectional rim, concentric with the rigid rim, stems passed through the outer rim and having heads, with the inner ends of the stems received in said sockets, springs around said stems and nuts on said stems bearing against the inner face of the outer rim, and collars held between the flanges of the inner rim and against which said springs bear.

In witness whereof I have hereunto set my hand in presence of two witnesses.

APOLLON MATHEY.

Witnesses:
 MARIN VACHON,
 AIMÉ FLÉCHET.